United States Patent [19]
Mimeur

[11] 3,718,215
[45] Feb. 27, 1973

[54] DEVICE FOR LIMITING THE NUMBER OF REVOLUTION OF A ROTATING SHAFT

[75] Inventor: Robert Mimeur, Sallanches, France
[73] Assignee: Ets. Carpano & Pons SA, Clauses, France
[22] Filed: Jan. 18, 1971
[21] Appl. No.: 106,961

[30] Foreign Application Priority Data

Jan. 19, 1970 France..................................7001743

[52] U.S. Cl. ......................192/141, 200/47, 200/158, 192/143
[51] Int. Cl..............................F16d 71/00, H01h 3/16
[58] Field of Search......192/141, 142 R, 143; 200/47, 200/158

[56] References Cited

UNITED STATES PATENTS 2,502,573  4/1950  Lee...................................192/141 X
1,551,512  8/1925  Goff......................................200/47

Primary Examiner—Allan D. Herrmann
Attorney—Robert E. Burns and Emmanuel J. Lobato

[57] ABSTRACT

A spline shaft rotatably driven by driving means meshes with two pinions having internally threaded bores engaging on two elongate members, partially screw threaded along their length, so that the pinions move along the elongate members in opposite directions upon rotation of the spline shaft. The pinions actuate stopping means after a certain number of revolutions of the spline shaft in a given direction. The elongate members are manually rotatable to adjust the starting positions of the pinions, and set the desired number of revolutions. Spring means urge the pinion towards the threaded parts of the elongated members if a pinion engages a non-threaded part of the member as a result of failure of the stopping means or over-adjustment of the starting position.

3 Claims, 2 Drawing Figures

DEVICE FOR LIMITING THE NUMBER OF REVOLUTION OF A ROTATING SHAFT

BACKGROUND OF THE INVENTION

The present invention relates to devices enabling limitation, at will and in the two directions, of the number of turns made by a rotating shaft driven by an electric motor in which the feed current is cut off when the required number of turns has been reached.

Several devices for this purpose are known. These devices use either the translational movement of an index moved by means of a helicoidal, flat or spiral cam, or the linear movement of one or more nuts along a screw the rotation of which is related to the movement of the rotating shaft, or other means for the transformation of a rotary motion into linear motion. In all of these types, a translationally moving member operates, at the end of its path in either direction, a control member which cuts off the feed current to the motor.

These devices generally have two serious drawbacks. Firstly, any defect in the driving members causing the continued passage of feed current when it should have been cut off inevitably causes destruction of or damage to the device. Moreover, the device for manual adjustment of the path of the translationally moving member is not visible in general and the "blind" rotational adjustment of these members beyond certain limits leads to incorrectly adjusted operation or damage to the device. These two drawbacks are particularly important if the mechanisms are operated by persons who are not trained to carry out such delicate operations.

SUMMARY OF THE INVENTION

The present invention aims to provide a device in which prejudicial consequences due to failure of the control members or incorrect manual operation are avoided, the translationally moving members being automatically uncoupled should they accidentally overrun a pre-set value.

The device according to the invention comprises a translationally fixed by angularly rotatable spline shaft rotatably driven by a rotatable shaft, and which meshes with two pinions threadably engaging upon two screw threaded elongate members along which they can move in opposite direction upon rotation of the spline shaft. According to the direction of rotation of the spline shaft, one or the other of the pinions moves to operate a fixed switch and thus cut off feed current to driving means for the shaft. In case the current is not switched off due to faulty operation of the switch, the rotating pinion leaves the thread of the screw with which is engaged, thus causing no damage. Means are provided so that the operator can turn the screw-threaded axes to regulate a desired number of turns ; any overrun of the maximum adjustment allowed causes the pinion to disengage its screw without causing any damage.

DESCRIPTION OF A PREFERRED EMBODIMENT

An embodiment of the invention will now be described by way of example, reference being made to the accompanying drawings, in which.

Figure 1:
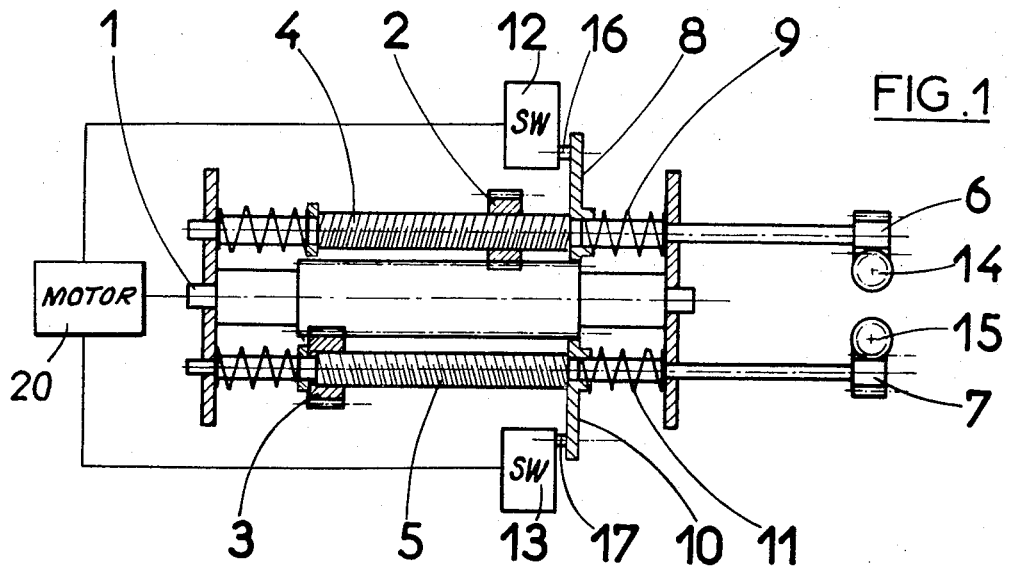
FIG. 1 is schematic view of a device in a working position.

As shown, the device comprises a spline shaft 1 rotatably supported on a frame of the device and driven by means of a rotatable shaft of an electric motor 20 (shown schematically) and which meshes with two pinions 2 and 3. These pinions threadably engage, like two nuts, on screws 4 and 5 respectively threaded with opposite hand threads. For one direction of rotation of spline shaft 1, the pinion 2 moves towards the right, for example, whereas the pinion 3 moves towards the left.

The number of turns of the rotatable shaft in one direction is limited by the distance between the respective pinions 2, 3 and a control piece operated thereby, 8 and 10 respectively. These two control pieces respectively operate switches 12 and 13 fixed on a frame (not shown) of the device. The construction of the switches when the pinion 2 or 3 is fully screwed to the right hand side is such that the pressure of the control pieces 8 or 10 on the push pieces 16 or 17 overcomes the pressure provided by springs 9 and 11 and cuts off a feed current, each switch controlling a particular direction of rotation of the shaft. The screws 4 and 5, are normally angularly fixed. However, they can be turned manually, for example by means of angle gears 6, 14 and 7, 15, the pinions 14 and 15 being rotatable from outside a casing enclosing the device. It is thus possible to provide a manual variation of the distance between each pinion 2 and 3 and their respective control piece 8 and 10.

In operation, starting with the mechanism in the position of FIG. 1, and with the two switches 12 and 13 closed by the control pieces 8 and 10 urged by springs 9 and 11, when the electric circuit is closed by the operator, the electric motor starts and rotatably drives the spline shaft 1. The pinions 2 and 3 are then rotatably driven in the same direction, which causes a translational movement of the pinions 2 and 3 in opposite directions. For example, pinion 2 moves towards the right hand side of the drawing and pinion 3 towards the left. When the pinion 2 reaches the control piece 8, it moves it and thus switches off the switch 12, which cuts the feed circuit and stops the device. The operator will therefore be unable to exceed the chosen number of turns.

When the machine is rotated in the opposite direction, the pinion 2 moves towards the left and the pinion 3 towards the right. The latter, at the end of its path, moves the control piece 10 and cuts off the switch 13. It is thus evident that the predetermined number of turns, corresponding to the translational motion of pinions 2 and 3, is permanently maintained at its pre-regulated value set by manual operation of pinions 14 and 15.

If one of the switches, for example 12, does not work properly and does not cut the current at the right time, the pinion 2 will leave the thread of screw 4 and, urged by the spring 11, remain in that position, while the spline shaft and pinions continue to turn. There will be therefore no damage to the device.

Figure 2:
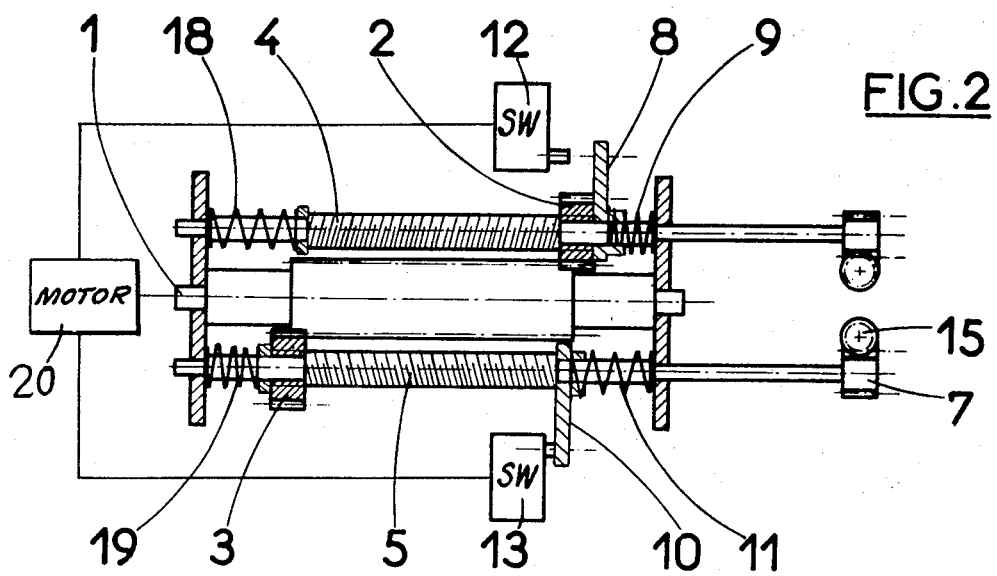
FIG. 2 shows the device in a rest position.

In the same way, as shown in FIG. 2, if the operator turns the screw 5 by hand, through the gear 15, 7 so that the pinion 3 moves towards the left of the drawing and leaves its thread, it will be disengaged from its screw and able to turn freely, without creating any damage, simply compressing the spring 19.

In the two cases, the simple reversal of rotation of the device automatically reengages the uncoupled pinions on their respective threads.

The device according to the invention can be used in any situation where an accurate adjustment of a whole or fractional number of turns made by a turning shaft is required. Instead of electric driving means, any other commutative, mechanical, pneumatic, fluid, hydraulic or electronic means can be used, without departing from the scope of the invention.

A particular field of application for such devices is the accurate and permanent adjustment of travel for blinds, sliding doors, roller blinds and other such devices, which are generally operated by unskilled persons. Other fields of application of the device can be named, such as the provision of precise alternating movement from a rotary movement, the programming of a machine tools as a function of the number of turns of a shaft, or for mobile advertising panels.

What is claimed is:

1. In combination with a spline shaft rotatably driven by driving means, a device for controlling the driving means to limit the number of turns of the spline shaft, comprising first and second elongate elements parallel to said spline and screw threaded along a part of their length with threads of opposite hand, first and second pinions having internally threaded bores engaging on said screw threaded elements respectively, said pinions meshing with said spline shaft so that rotation of the spline shaft causes rotation of the pinions and movement thereof in opposite directions along the screw threaded parts of the respective elongate elements, and means for stopping said driving means, said stopping means being actuatable by one or the other of said pinions upon movement of the pinions along the screw threaded part of the respective elongate elements.

2. A control device according to claim 1, comprising means for rotating the first and second elongate members whilst the driving means is stopped to enable positional adjustment of the first and second pinions relative to the stopping means.

3. A control device according to claim 2, comprising means for urging the first and second pinions towards the threaded parts of the first and second elongate members when either one of the first and second pinions engages on an unthreaded part of the respective one of the first and second elongate members as a result of failure of the stopping means or excessive positional adjustment of the first and second pinions.

* * * * *